Figure 1:
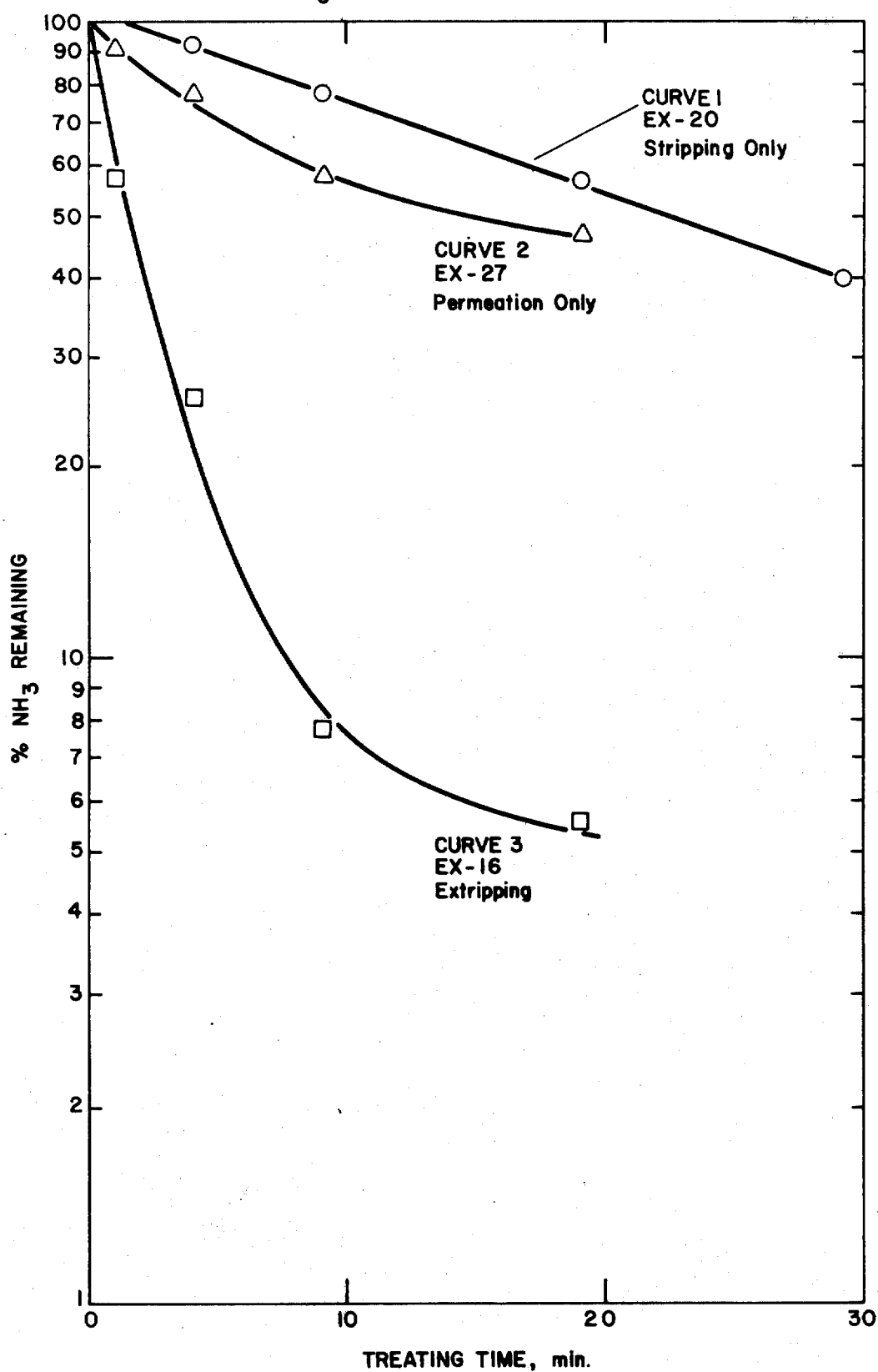

United States Patent [19]

Li et al.

[11] 4,029,744
[45] June 14, 1977

[54] PROCESS FOR REMOVING THE SALT OF A WEAK ACID AND A WEAK BASE FROM SOLUTION

[75] Inventors: Norman N. Li, Edison; Robert P. Cahn, Millburn, both of N.J.

[73] Assignee: Exxon Research and Engineering Company, Linden, N.J.

[22] Filed: Apr. 14, 1975

[21] Appl. No.: 567,623

Related U.S. Application Data

[63] Continuation of Ser. No. 382,466, July 25, 1973, abandoned.

[52] U.S. Cl. ............................ 423/356; 210/22 R; 210/23 R; 210/37 R; 210/38 R; 260/541; 260/619 R; 423/372; 423/539; 423/563; 423/658.5
[51] Int. Cl.² ......................................... C01C 1/02
[58] Field of Search ...................... 260/541, 619 R; 423/563, 658.5, 356, 352, 237, 242, 245, 561 R, 226, 227, 228, 229, 539, 372; 210/21, 22, 23 F, 23 H, 23 R, 24, 28, 37 R, 38 R, 59, 44, 29

[56] References Cited

UNITED STATES PATENTS

| | | | |
|---|---|---|---|
| 2,773,003 | 12/1956 | Brown | 210/21 |
| 3,370,102 | 2/1968 | Carpenter | 210/23 H |
| 3,595,615 | 7/1971 | Kaparakos | 423/356 |
| 3,620,674 | 11/1971 | Renault | 423/343 |
| 3,649,190 | 3/1972 | Deschamps | 423/237 |
| 3,769,207 | 10/1973 | Baer | 210/44 |
| 3,779,907 | 12/1973 | Li | 210/59 |

FOREIGN PATENTS OR APPLICATIONS 2,036,167 12/1970 France ................. 4 23/226

*Primary Examiner*—L. Dewayne Rutledge
*Assistant Examiner*—Michael L. Lewis
*Attorney, Agent, or Firm*—Robert J. Baran; Joseph J. Allocca

[57] ABSTRACT

The salt of a weak acid and a weak base is removed from a solution by contacting said solution with an emulsion. Said emulsion comprises an exterior phase which is characterized as immiscible with said solution and permeable to the weak acid and/or weak base in their un-ionized forms. One of the species which can permeate through said exterior phase reacts with a reactant present in the interior phase of the emulsion which converts said permeating species to a nonpermeable form, i.e., by neutralization, thus providing a continuing driving force for the permeation of said permeating species. The other nonreacting or nonpermeating species is stripped from solution by passing an inert gas through said solution. Stripping and neutralization in the interior phase of the emulsion are carried out simultaneously. By selection of the reactant present in the interior phase of the emulsion, the process of the instant invention may be designed to remove either the weak acid or the weak base in the interior phase of the emulsion. In a preferred embodiment, ammonium sulfide, dissolved in an aqueous solution, is removed from said aqueous solution by permeating ammonia through the exterior phase of an emulsion and neutralizing said ammonia in the interior phase wth an acidic reactant. Simultaneously, hydrogen sulfide is removed by steam stripping or air blowing of the aqueous solution.

22 Claims, 3 Drawing Figures

PROCESS FOR REMOVING THE SALT OF A WEAK ACID AND A WEAK BASE FROM SOLUTION

CROSS REFERENCE TO RELATED APPLICATIONS

This application is a continuation of U.S. Ser. No. 382,466, filed on July 25, 1973, now abandoned, in the names of Norman N. Li and Robert P. Cahn.

FIELD OF THE INVENTION

1. Background of the Invention

The salt of a weak acid and a weak base is removed from a solution by contacting said solution with an emulsion. Said emulsion comprises an exterior phase which is characterized as immiscible with said solution and permeable to the weak acid and/or weak base in their un-ionized forms. One of the species which can permeate through said exterior phase reacts with a reactant present in the interior phase of the emulsion which converts said permeating species to a nonpermeable form, i.e., by neutralization, thus providing a continuing driving force for the permeation of said permeating species. The other nonreacting or nonpermeating species is stripped from solution by passing an inert gas through said solution. Stripping and neutralization in the interior phase of the emulsion are carried out simultaneously. By selection of the reactant present in the interior phase of the emulsion, the process of the instant invention may be designed to remove either the weak acid or the weak base in the interior phase of the emulsion. In a preferred embodiment, ammonium sulfide, dissolved in an aqueous solution, is removed from said aqueous solution by permeating ammonia through the exterior phase of an emulsion and neutralizing said ammonia in the interior phase with an acidic reactant. Simultaneously, hydrogen sulfide is removed by steam stripping or air blowing of the aquesolution.

2. Description of the Prior Art

A process for separating volatile bases, e.g. ammonia, and weak volatile acids, e.g. $H_2S$, from their salts or the liquid or gaseous dissociation products thereof, which comprises contacting these salts in a first step with a nonvolatile acid, e.g. benzoic acid, in the presence of at least one liquid phase at a temperature and pressure at which the volatile acid is evolved in the form of a gas, and then in a second step increasing the temperature or reducing the pressure to liberate the volatile base and regenerate the acid, is taught in U.S. Pat. No. 3,649,190. This process requires two steps since the same reagent is utilized to remove both the volatile acid, i.e. by neutralization, and the volatile base, i.e. by decomposition. The process further requires two steps since the second step, wherein the base is removed from its reaction product with said nonvolatile acid, is necessarily carried out at a higher temperature or lower pressure than the first step. This process is generally more inefficient than a one-step process wherein said weak acid and weak base may be removed simultaneously.

U.S. Pat. No. 3,620,674 teaches the reverse of the above process; that is, a two-stage process for regenerating volatile bases and weak volatile acids from the salts which comprises contacting in a first stage the salt with an organic base of low volatility to liberate the volatile base in a gaseous form and liberating the weak volatile acid in a gaseous form in a second stage while regenerating the base of low volatility in the liquid phase. Once again, it is a two-step process which is taught which is necessarily more inefficient than a one-step process which removes the same weak acids and weak bases. Furthermore, in both cases it is apparent that the nonvolatile acid or base which is utilized to remove the volatile acid or base from solution is necessarily left behind and would cause further problems in that the nonvolatile acid or base is a contaminant of the aqueous solution and may have to be separated therefrom. It is apparent from this discussion that the processes of U.S. Pat. Nos. 3,620,674 and 3,649,190 are eminently unsuitable to the treatment of dilute aqueous solutions of said weak acid/weak base salts, and this is precisely the field in which the process of the present application is most applicable, i.e. water pollution abatement.

Other processes for the removal of $H_2S$ and ammonia from aqueous solutions are known in the art. See, for example, U.S. Pat. No. 3,518,166 which describes the difficulties which are encountered in a process wherein $H_2S$ and ammonia are separated by means of the prior art methods. The patentee deals with these difficulties by utilizing a multi-step process wherein $H_2S$ is stripped out of an aqueous solution in a first distillation column to obtain an $H_2S$ rich overhead stream and an aqueous bottom stream of reduced $H_2S$ content. Ammonia is stripped out of said aqueous bottom stream in a second distillation column to obtain an ammonia-rich vapor overhead which is partially condensed to obtain an ammonia-rich vapor and an ammonia-rich overhead condensate contaminated with some $H_2S$. This ammonia-rich condensate is combined with the aqueous solution containing $H_2S$ and ammonia, which is passed to the first distillation column. This reference is cited to show the difficulties encountered in removing ammonium sulfide from aqueous solution and the complicated methods employed at present.

Other processes are known wherein the salts of weak bases with strong acids are separated by precipitation methods. See, for example, U.S. Pat. No. 3,321,275.

In copending application Ser. No. 174,990, filed on Aug. 25, 1971, in the names of N. N. Li, R. P. Cahn and A. L. Shrier, now U.S. Pat. No. 3,779,907 a process for the removal of ammonia and/or sulfide is described which utilizes the liquid membrane technique described in U.S. Pat. Nos. 3,410,794; 3,454,489; 3,617,546 and 3,650,091.

Other processes which rely on stripping with inert gases to remove ammonia and $H_2S$ from water are disclosed in U.S. Pat. No. 2,927,075.

SUMMARY OF THE INVENTION

The instant invention relates to a process for removing the salt of a weak acid and a weak base from solution which comprises contacting said solution with an emulsion, said emulsion comprising an exterior phase, said exterior phase being characterized as immiscible with said solution and permeable to either or both said weak base and weak acid, and an interior phase, said interior phase comprising a reactant which is capable of converting either said permeating weak base or weak acid to an impermeable form. This provides a continuing driving force for the permeation of the species which reacts with said reactant, thus insuring its continued permeation through said exterior phase. The nonreacting species is removed by stripping the aqueous solution with an inert gas. In order to achieve efficient and essentially complete removal of both the weak acid and weak base from the solution, the process is preferably run so that both the stripping and the permeation are carried out simultaneously.

In a preferred embodiment of the instant invention the salt is present in an aqueous solution and is selected from the group consisting of ammonium salts of volatile weak acids such as ammonium sulfide and bisulfide, sulfites, cyanide, phenate, acetate, and carbonates; and salts of organic bases, e.g. amines and other nitrogen compounds, such as amine sulfides or carbonates, especially amines having from 1 to 5, preferably 1 to 3, carbon atoms per nitrogen, and preferably having no more than 10 carbon atoms.

By the addition of oil soluble cation exchange resins to the external phase, i.e., sulfonic acid or carboxylic acid group containing polymers, many common metal ions can be allowed to permeate into the interior phase where they can be reacted with a reagent dissolved in said interior phase to form a nonpermeating species, i.e. by precipitation. Thus, solution of carbonate, sulfides, sulfites, cyanides, acetates, etc. of many metals, i.e. copper, calcium, iron, can be treated in the manner of this invention.

The process of the instant invention is especially suitable for the removal of ammonium sulfides or carbonates from dilute aqueous solution, and can be used to illustrate the underlying concept which governs this novel method of separation.

When ammonium sulfide is dissolved in water, the salt will completely dissociate into ammonium and sulfide ions, which in turn establish a hydrolysis equilibrium with the hydrogen ion and hydroxyl ion present in the aqueous phase to form as hydrolysis products undissociated ammonia, undissociated hydrogen sulfide as well as bisulfide ion. The resultant mixture has a composition and pH governed by the concentration and dissociation constants of the various species involved.

The vapor pressures of the hydrolysis products, $NH_3$ and $H_2S$, over this solution are a function of (a) the solubility of these gases in water at the given temperature and of (b) the concentration of undissociated $NH_3$ and $H_2S$ in the solution. Since $NH_3$ and $H_2S$ are a weak base and acid, respectively, the concentration of the undissociated species is a strong function of pH. Similarly, the solubility and hence permeability of these materials through the external membrane phase is strongly dependent on the concentration of undissociated species.

Figure 2:
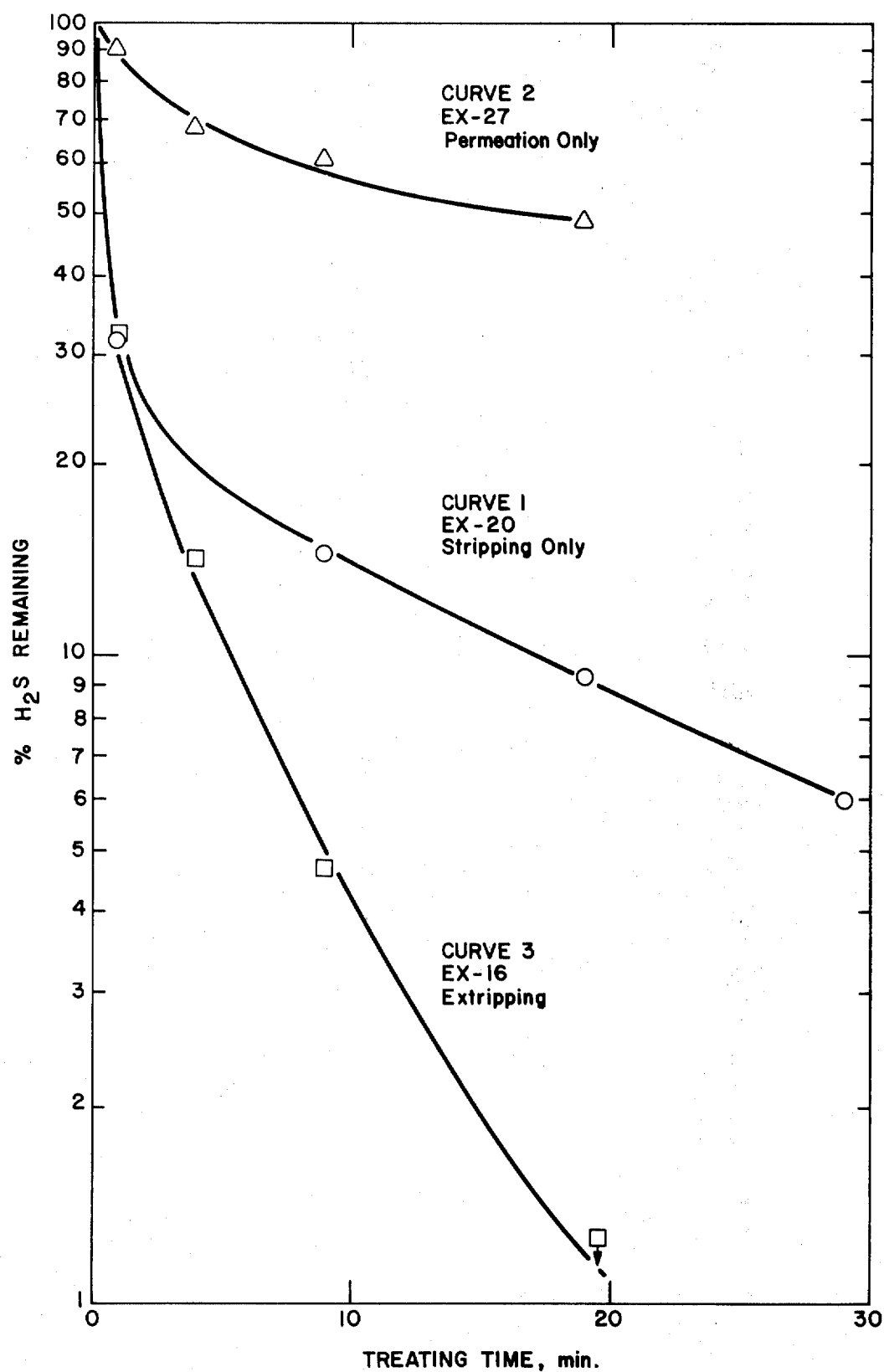

If we now strip a dilute aqueous solution of ammonium sulfide or bisulfide with a gas stream, predominantly $H_2S$, because of its low solubility, will come off initially. As $H_2S$ removal proceeds, the pH of the solution rises which has a deleterious effect on the fraction of undissociated $H_2S$ in the solution. This, in turn, sharply depresses the partial pressure of $H_2S$ over the solution, greatly retarding the removal of $H_2S$. At the same time, the fraction of undissociated $NH_3$ rises (due to the increased pH), enhancing the $NH_3$ partial pressure. However, $NH_3$ is so soluble in aqueous solutions that only poor $NH_3$ removal ensues. Consequently, poor $NH_3$ and $H_2S$ removal results when a dilute solution is only vapor stripped (see Curve 1 in FIGS. 1 and 2 of the attached drawings. By the same token, if this dilute solution is now contacted with an emulsion containing as an internal phase an aqueous acid solution, and as an external phase, a water immiscible oil membrane through which both undissociated $NH_3$ and $H_2S$, because of their solubility in the oil phase, can permeate, immediately upon contact, both undissociated $H_2S$ and $NH_3$ will commence to permeate through the oil membrane in order to equalize the concentration of undissociated species on both sides of the membrane, i.e. in the dilute aqueous solution and in the internal acid solution. This equalization will be rapidly accomplished with $H_2S$ and permeation will stop. For the $NH_3$, however, no sooner has undissociated $NH_3$ entered the internal phase, then it will be neutralized by the acid present and converted into non-permeating ammonium ion. Thus, ammonia transfer would tend to continue from the outside into the emulsion.

However, as the outside solution becomes depleted in ammonia, its pH will drop. This, as previously discussed, has a detrimental effect on the fraction of ammonia present as undissociated species, i.e. on the rate of ammonia removal by permeation. Consequently, as evidenced by Curves 2 in FIGS. 1 and 2 of the drawings, extraction via liquid membrane alone is an unsatisfactory method of removing ammonium sulfide from dilute aqueous solution.

Now, if the two processes described above, $H_2S$ removal by gas stripping and $NH_3$ removal by permeation, are carried out simultaneously, both processes will balance each other and maintain the pH of the aqueous solution within proper bounds. Consequently, neither process will cease and removal of both $NH_3$ and $H_2S$ via their respective routes can be carried to completion and at higher rates. This is illustrated by Curve 3 in FIGS. 1 and 2.

The mechanism described above will hold equally well with the other salts mentioned above, provided one species, i.e. the acid or base, is removed via the liquid membrane and the other species, i.e. the base or acid, via gas stripping. If it is desirable to remove the weak acid via the liquid membrane, an internal phase comprising a suitable aqueous base solution is employed.

The emulsion, which is utilized to remove either the weak acid or the weak base, is prepared by techniques known in the art so as to allow the permeation of either the weak acid or the weak base through the exterior phase into the interior phase wherein a reactant is present to convert the permeating species to a nonpermeable species. The exterior phase of the emulsion must be designed so as to be immiscible with the solution with which it will be contacted. In the case of the preferred embodiment wherein the solution containing the above described salt of a weak acid and a weak base is aqueous, the exterior phase of the emulsion may be conveniently prepared by utilizing a hydrocarbon as the exterior phase. Other water immiscible solvents may likewise be utilized, e.g. halogenated hydrocarbons, fats and oils of animal or vegetable origin, higher molecular weight alcohols and esters, etc. The interior phase will be an aqueous solution containing either a reagent capable of reacting with the permeating species or an adsorption medium. For example, in the case where ammonia permeates through the membrane, aqueous sulfuric acid may be conveniently used as the interior phase. When the permeating species is an organic nitrogen compound such as an amine, activated carbon may be conveniently used as an adsorption medium in the interior phase.

The internal phase of the emulsion may contain a reactant which is regenerable or nonregenerable. By regenerable it is meant that after contacting with the aqueous solution the emulsion may be removed to a regenerating zone wherein the emulsion is heated and steam stripped to remove the permeating species thereby regenerating the emulsion for reuse.

Regenerable acids within the scope of the instant invention must have the following general properties:
1. they must be soluble in water at a level of from about 1 to about 5 moles/liter of ammonia capacity; that is, aqueous solutions of the regenerable acids must be able to neutralize from about 1 to 5 moles/liter of ammonia;
2. the pH of the regenerable acids should vary from about 2 to about 6, preferably from about 3 to about 5;
3. the regenerable acids must be capable of reacting with ammonia at the temperatures at which the instant process will be run; that is, from 25° to about 100° C;
4. when the aqueous solutions of these regenerable acids are heated to the regeneration temperature of from about 100° to about 250° C, the ammonia partial pressure, in the case wherein ammonia is removed by neutralization in the membrane, should be at least one-twentieth of the total solution vapor pressure; and
5. the partial pressure of the acid at the regeneration temperatures disclosed above should be less than 1% of the total vapor pressure.

The regenerable acids of the instant invention, of course, must all have at least one hydrogen available for exchange with the weak base, e.g. ammonia. Preferred regenerable acids include phosphoric acid and the salts thereof, benzene polycarboxylic acid and the salts thereof, e.g. benzoic acid, phthalic acid, pyromellitic acid, trimellitic acid, trimesic acid and the salts thereof, especially the ammonium, sodium and potassium salts; aliphatic polycarboxylic acids and the salts thereof including maleic acid, succinic acid, fumaric acid, 7-carboxydecanoic acid and the salts thereof; sulfocarboxylic acids including both aliphatic and aromatic derivatives, e.g. 5-sulfoisophthalic acid, 5-sulfopentanoic acid and the salts thereof; monocarboxy acids having sufficient functional groups to decrease their oil solubility, for example salicylic acid, and the various other hydroxy aliphatic acids, etc. As can be seen from the above list of regenerable acids which are preferred for use in the instant invention, high solubility in water is desirable. Regenerable acids having lower water solubility may be substantially taken up by the nonaqueous exterior phase of the emulsion and thus result in ineffective systems.

When it is desired to separate a weak acid in the interior phase of the emulsion, a regenerable base may be utilized. Examples of regenerable bases, which functionally should meet the same requirements as described above for regenerable acids (except for the pH, which in the case of regenerative bases should vary from about 8 to about 10.5), are the various amines and hydroxyamines, e.g., ethanolamine, diethanolamine, triethanolamine, 5-carboxypentamine; various polyamines, e.g., ethylenediamine etc.; alkaline and alkaline earth carbonates, phosphates, borates, etc., e.g. $K_2CO_3$, $KHCO_3$, $K_3PO_4$, etc.

Regeneration can be achieved at 230°–450° F and 5–300 psig.

In the embodiment of the instant invention wherein regenerable emulsions are utilized, the regeneration can be effected after breaking the emulsion, or without breaking the emulsion. The emulsion which is utilized in the instant process may also be of a nonregerable nature. For example, in one embodiment wherein ammonia is removed through the exterior phase of the emulsion while $H_2S$ is steam stripped, the ammonia may be neutralized with sulfuric acid or phosphoric acid in the internal phase of the emulsion whereby the ammonia is converted to the ammonium ion, a nonpermeable form of ammonia. The emulsion is then sent to a de-emulsification zone wherein the emulsion is broken and the exterior phase, along with surfactants present therein, cycled to a stage wherein fresh emulsion is prepared. The internal phase, which will now contain aqueous ammonium sulfate or ammonium phosphate, may be utilized in a manner which will be known to the skilled artisan.

The aqueous solution of the weak acid/weak base salt is stripped with an inert gas in the presence of the emulsion in order to remove the nonpermeating species. Stripping may be accomplished at temperatures ranging from ambient (75° F) to about 220° F, at pressures ranging from 5–50 psia. The stripping gas rate is a group function of pressure, temperature and solution pH, and, of course, the specific species to be stripped out, but is easily calculable by conventional chemical engineering techniques once these variables are known. For stripping $H_2S$ out of ammoniacal sour waters, these stripping rates can be computed as described in M. R. Beychok "Aqueous Wastes from Petroleum and Petrochemical Plants," J. Wiley and Sons, N.Y. 1967, pages 158–196. While conventional steam stripping towers operate under 5–25 psig pressure and with stripping steam rates of 1–2 lb/gal of sour water feed, the process of this invention can operate conveniently at, say, 5–10 psia, and steam rates of 0.05–0.25 lb/gal. Inert gas or air in place of or in addition to steam can also be used. Stripping is preferably carried out in a countercurrent multistage tower.

PREFERRED EMBODIMENT

A refinery sour water stream containing from 500 to 15,000 ppm ammonium sulfide in water is contacted with an emulsion comprising a hydrocarbon exterior phase and an interior phase containing the monoammonium salt of succinic acid in water. The emulsion is prepared by mixing at high shear conditions, 50 parts of a hydrocarbon mixture, e.g. Solvent 100 Neutral, an isoparaffinic solvent available from Exxon Chemical, containing 5 wt % of Span-80, with 50 parts of a 30% solution of the succinic acid salt in water. The emulsion is mixed with said refinery sour water stream and the two streams are fed together to the top of a stripping tower at a temperature of 185° F. Simultaneously, steam is passed into the bottom of the tower. The steam and the refinery sour water stream are contacted countercurrently. The liquid residence time in the stripping tower is from ½ to 3 minutes. As described, the aqueous sour water stream together with the emulsion is brought in at the top of the tower and travels down the tower to the bottom where it is removed. The aqueous sour water stream leaving the bottom of the tower will now be depleted in ammonium sulfide. The stream may be circulated to a second tower for further contacting. The emulsion, which will now be depleted in free succinic acid by virtue of neutralization with the permeating ammonia, is separated from the effluent aqueous stream and sent to a regeneration zone. The spent emulsion is heated to about 400° F and sent to the regeneration zone where steam is contacted countercurrently with the spent emulsion at a temperature from 230° to 450° F and a pressure of 5–300 psig, but preferably between 375°–425° F and 200–275 psig. The steam is blown through the emulsion at a rate of 0.5 to 1.0 lb/gal of water being treated in the stripper tower with the emulsion. In the same water stripping tower, the emulsion is spent by virtue of the permeating ammonia, neutralizing the internal aqueous acid solution from the monoammonium salt to substantially the diammonium salt of succinic acid. In the regenerator the emulsion is now substantially regenerated by driving off the absorbed ammonia so that the diammonium salt reverts back to substantially the monoammonium succinate, from 30 to 70% neutralization.

The regenerated ammonia plus accompanying steam are taken overhead for subsequent fractionation to high purity, substantially anhydrous ammonia.

In an alternate embodiment of the instant invention the emulsion will contain sulfuric acid. The emulsion, after contacting with the sour water stream, will be depleted in free sulfuric acid by means of neutralization with the permeating ammonia species. The internal phase, which will contain from 25–40% ammonium sulfate, is cycled to a de-emulsification zone wherein the emulsion is broken, the surfactant-containing hydrocarbon layer is separated for reuse in forming fresh emulsions with fresh acid, and the aqueous ammonium sulfate solution is fed to an appropriate unit for recovery of ammonium sulfate.

Figure 3:
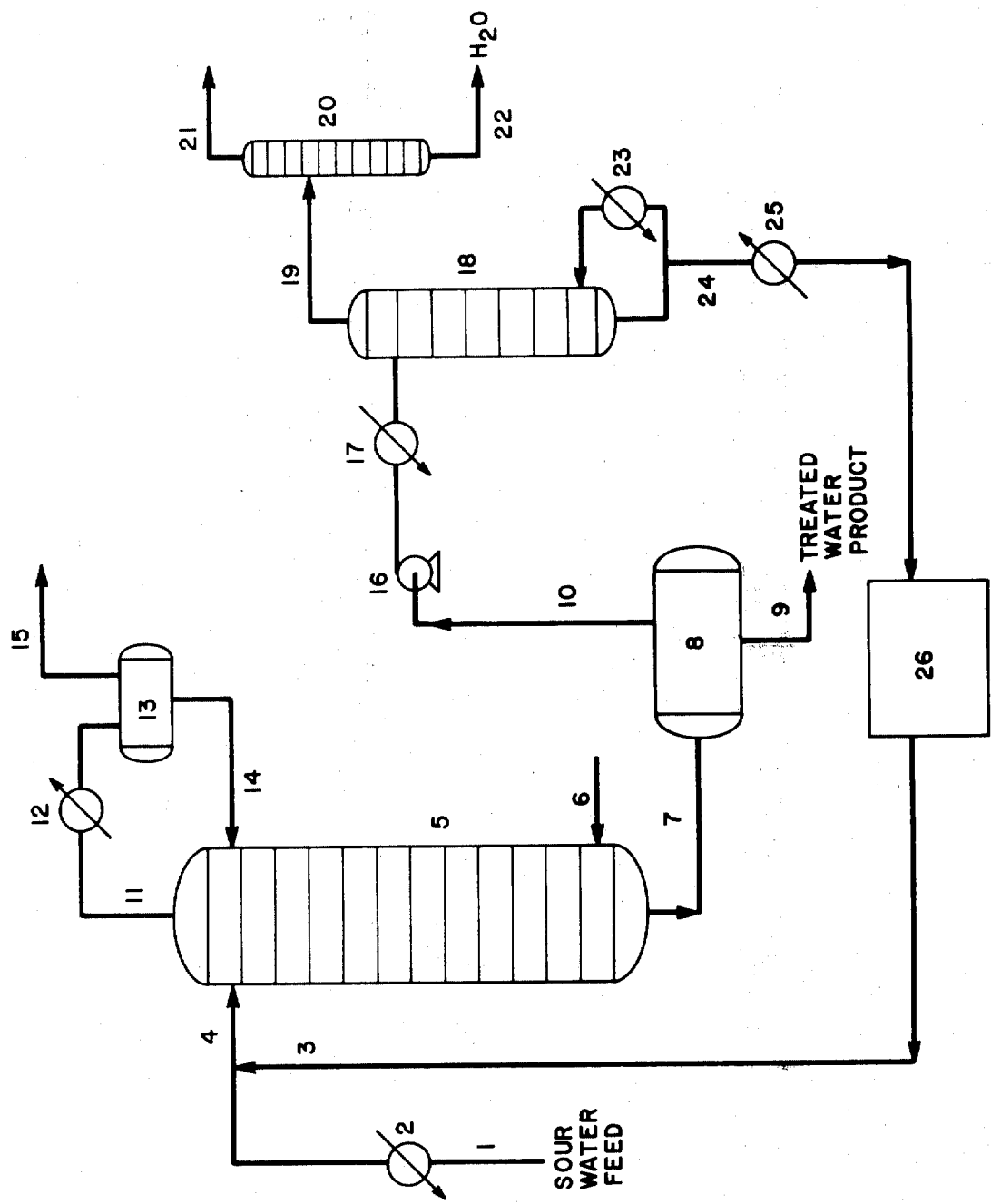

The process of this invention will be made clear by reference to FIG. 3 which illustrates the technique for stripping refinery sour water containing ammonia and hydrogen sulfide with the use of a regenerable liquid membrane emulsion.

The emulsion comprises an external oil phase and an internal aqueous monoammonium succinate phase, as discussed before, and is capable of drawing ammonia selectively out of dilute aqueous solution also containing a weak acid, such as hydrogen sulfide.

The refinery sour water containing up to 15,000 ppm ammonium sulfide is introduced via line 1, preheated in heater 2 to about 180° F and mixed with fresh or regenerated acid emulsion coming through line 3 and introduced into stripper tower 5 via line 4. This tower may operate under a vacuum of 5–10 psia when steam is introduced via line 6 at the bottom of the tower. Alternatively, it can operate under atmospheric or elevated pressure when an inert gas or air is admitted with or without steam via line 6. The simultaneous stripping/permeation process occurs while the sour water/emulsion mixture descends through the tower countercurrent to the ascending gas. Water, essentially free of both ammonia and hydrogen sulfide, is taken off, admixed with the spent emulsion via line 7, and allowed to settle in drum 8. Treated water is removed via 9, while the spent acid emulsion is sent to further processing via line 10.

The hydrogen sulfide together with the inert gas, such as steam, is taken off the tower in line 11, cooled in condenser 12 and any water settled out in distillate drum 13 and refluxed back to the tower 5 through line 14. Essentially pure hydrogen sulfide gas, possibly mixed with inert gas or air (but not ammonia) is taken overhead through line 15 to its proper disposal, such as a Claus plant for sulfur recovery.

The spent emulsion is pumped by pump 16 through preheater 17 into regenerator tower 18, where the spent emulsion is decomposed into ammonia rich overhead gas leaving via line 19 and a regenerated acidic emulsion via line 24. A reboiler 23 provides the necessary heat and stripping vapor for this regeneration.

The ammonia rich ammonia/steam mixture taken overhead through line 19 can be fed directly to a conventional ammonia/water fractionator 20 which, with proper reflux and reboil, separates the feed into an ammonia overhead 21 and water bottoms 22.

The regenerated emulsion is cooled in exchanger 25 and fed to an emulsion make-up and maintenance system 26 before recycling back into the stripping tower via line 3. The facilities in system 26 may include an emulsifier to repair that part of the emulsion which may have broken during the high temperature regeneration step, fresh emulsion make-up facilities and disposal facilities for discard emulsion which may have undergone undesirable chemical change.

If, in place of the regenerable emulsion, a nonregenerable emulsion is used, i.e. the interior phase is a sulfuric or phosphoric acid solution, all the regeneration equipment from items 17 through 25 can be deleted. However, system 26 now is expanded to include emulsion breaking, complete emulsion make-up, and, if necessary, ammonium salt solution handling or drying facilities.

The following experiments were designed to demonstrate that simultaneous gas stripping to remove $H_2S$ and liquid membrane extraction to remove $NH_3$ by permeation can effectively reduce the ammonium sulfide content of a dilute aqueous solution.

In all cases about 1,450 g of the dilute aqueous solution containing about 1,500–2,000 ppm by weight each of ammonia and hydrogen sulfide was contacted with the treating agent at a temperature of 185° F. A vacuum was applied during the operation as required to achieve the necessary boil up to simulate steam stripping in a column. The two-phase mixture was stirred with a mechanical agitator in the effectively single-stage batch treater.

The emulsion was prepared by adding the aqueous succinic acid (monoammonium salt) solution with vigorous stirring slowly to the oil phase (Solvent 100 Neutral, an isoparaffinic solvent) having detergent/thickener (Lubrizol 3702, a styrene-maleic anhydride copolymer wherein 95% of the groups are esterified with C10–C18 alcohols) dissolved in it.

The actual experiments were carried out by sampling the aqueous phase initially, stirring the emulsion/aqueous phase mixture for the length of time indicated with the boilup rate shown by applying a vacuum, and allowing to settle. The concentrations of both ammonia and hydrogen sulfide were measured after each stirring period and are reported in Table I and Table II and illustrated in FIGS. 1 and 2.

Experiment 1 (EX-20)

In this experiment only the aqueous phase was treated in the manner described above, no emulsion being added. Very incomplete ammonia removal by the stripping steam is evident. Hydrogen sulfide is taken out, but quite slowly.

Experiment 2 (EX-27)

No vacuum was applied while the emulsion was agitated with the aqueous phase to be treated. Hydrogen sulfide could not leave the solution to any extent since there was no stripping action. Consequently, ammonia removal by permeation into the emulsion was severly retarded.

mixture was contacted with the aqueous phase during the stripping. Very poor contaminant removal resulted.

TABLE I

SOUR WATER STRIPPING EXPERIMENTS
(1450 cc sour water, 185° F., 245 RPM stirrer speed)

| Run No. | EX-20 | | | EX-27 | | | EX-16 | | |
|---|---|---|---|---|---|---|---|---|---|
| Type of Operation | Stripping only | | | Permeation Only | | | Extripping | | |
| Emulsion/Sour Water, w/w | — | | | 0.25 | | | 0.25 | | |
| Boil-up Rate, % vapor'n/hr. | 17.4 | | | — | | | 20.0 | | |
| Emulsion Composition | | | | | | | | | |
| Oil/Aqueous, w/w | — | | | 1.2 | | | 1.2 | | |
| Oil Type (wt. % in oil phase) | — | | | Solv.100N (88%) | | | Solv.100N (88%) | | |
| Additive Type (wt. % in oil phase) | — | | | Lubr.3702 (12%) | | | Lubr.3702 (12%) | | |
| NH₃ in aq. phase, wt. % | — | | | 5.2 | | | 5.2 | | |
| Succinic acid in aq. ph. wt. % | — | | | 30.0 | | | 30.0 | | |
| NH₃/succ. acid, mol/mol | — | | | 1.2 | | | 1.2 | | |
| Sour Water Composition, wppm | NH₄⁺ | S⁻ | pH | NH₄⁺ | S⁻ | pH | NH₄⁺ | S⁻ | pH |
| Initial | 1520 | 2120 | 8.8 | 1760 | 1760 | 8.7 | 2040 | 1560 | 9.0 |
| after 1 min. | 1560 | 672 | 9.2 | 1600 | 1580 | 8.7 | 1170 | 500 | 9.1 |
| after 4 min. | 1400 | 420 | 9.4 | 1370 | 1200 | 8.4 | 530 | 220 | 8.8 |
| after 9 min. | 1180 | 306 | 9.4 | 1020 | 1072 | 8.3 | 160 | 74 | 7.6 |
| after 19 min. | 860 | 194 | 9.4 | 820 | 848 | 7.7 | 115 | <20 | 7.6 |
| after 29 min. | 610 | 126 | 9.5 | — | — | — | | | |
| % Removal | NH₃ | | H₂S | NH₃ | | H₂S | NH₃ | | H₂S |
| after 1 min. | 0 | | 68 | 9 | | 10 | 43 | | 68 |
| after 4 min. | 8 | | 80 | 22 | | 32 | 74 | | 86 |
| after 9 min. | 22 | | 86 | 42 | | 39 | 92 | | 95 |
| after 19 min. | 44 | | 91 | 53 | | 52 | 94 | | 99 |

TABLE II

EXTRIPPING WITH AND WITHOUT ENCAPSULATED ACID
(1450 cc sour water, 185° F., 245 RPM stirrer speed)

| Run No. | EX-17 | | | EX-21 | | |
|---|---|---|---|---|---|---|
| Type of Operation | Extripping with encapsulated acid | | | Extripping without encapsulated acid | | |
| Emulsion/Sour Water, w/w | 0.243 | | | 0.240 | | |
| Boil-up Rate, % vapor'n/hr | 15.3 | | | 17.1 | | |
| Emulsion Composition | | | | | | |
| Oil/Aqueous, w/w | 1.2 | | | Oil Only | | |
| Oil Type (wt. % in oil phase) | Solv. 100N (88%) | | | Solv. 100N (88%) | | |
| Additive Type (wt. % in oil phase) | Lubr. 3702 (12%) | | | Lubr. 3702 (12%) | | |
| NH₃ in aq. phase, wt. % | 5.2 | | | no aqueous emulsion phase | | |
| Succinic acid in aq. phase, wt. % | 30.0 | | | | | |
| NH₃/succ. acid, mol/mol | 1.2 | | | | | |
| Sour Water Composition, wppm | NH₄⁺ | S⁻ | pH | NH₄⁺ | S⁻ | pH |
| Initial | 1720 | 1960 | 8.8 | 1720 | 2000 | 8.7 |
| after 1 min. | 1120 | 276 | 7.8 | 1620 | 640 | 9.1 |
| after 4 min. | 420 | 240 | 8.3 | 1380 | 366 | 9.3 |
| after 9 min. | 210 | 106 | 8.0 | 1220 | 294 | 9.3 |
| after 19 min. | 180 | <20 | 7.9 | 1040 | 234 | 9.5 |
| % Removal | NH₃ | | H₂S | NH₃ | | H₂S |
| after 1 min. | 35 | | 86 | 6 | | 68 |
| after 4 min. | 76 | | 88 | 20 | | 82 |
| after 9 min. | 88 | | 95 | 29 | | 85 |
| after 19 min. | 90 | | 99 | 40 | | 88 |

Experiment 3 (EX-16)

Both extraction and stripping were carried out simultaneously, and rapid removal of both contaminants was achieved.

Experiment 4 (EX-17)

Another simultaneous extraction/stripping experiment showed good removal of both contaminants. Since the boil-up rate was somewhat slower in this run than the previous experiment, the decrease of concentrations was somewhat slower.

Experiment 5 (EX-21)

Experiment 4 was repeated, but instead of the acid containing emulsion, only an oil-detergent/thickener The following experiments were carried out to demonstrate that ammonium succinate solutions and emulsions containing such solutions could be regenerated.

Experiment 6

An aqueous solution containing 3.384 g mol of ammonia and 1.716 g mol NH₃/g mol succinic acid was found to have a pH of 6. This solution was heated to 400° F at 245–255 psig and a vapor sample taken. The ammonia concentration in this vapor was 10.2 mol %.

Experiment 7

The procedure of Experiment 6 was repeated except that the ammonia level in the starting solution was reduced to 1.45 g mol $NH_3$/g mol succinic acid. The ammonia concentration in the vapor sample was 5.6 mol %, the remainder water.

Experiment 8

The procedure of the previous two experiments was repeated, except that the starting material was an emulsion of the succinic acid salt solution in oil. 440 g of the oil phase (88% Solvent 600 Neutral, 12% Lubrizol 3702 additive) were used to emulsify 250 g of aqueous solution. The aqueous solution contained 2.35 g mol/l of succinic acid and an ammonia/succinic acid ratio of 1.82 mol/mol. Three vapor samples were taken, containing 6.2, 13.2 and 6.1 mol % of ammonia, respectively, at 405°–410° F, 250–270 psig.

After the heating period, about 60% of the emulsion had broken. It could easily be reemulsified and was found to be a satisfactory treating agent for additional ammonia removal.

What is claimed is:

1. A process for removing the salt of a volatile weak acid and a weak base from aqueous solution which comprises contacting said solution with an emulsion under conditions of agitation, sufficient to maintain the emulsion dispersed in said aqueous solution, said emulsion comprising an exterior phase, said exterior phase being characterized as immiscible with solution and permeable to said weak base, and an interior phase, said interior phase comprising a reactant which is capable of converting said weak base to an impermeable form whereby said weak base permeates through said exterior phase into said interior phase wherein it is converted to a nonpermeable form, and simultaneously removing said volatile weak acid by passing an inert gas through said solution.

2. The process of claim 1 wherein said inert gas is steam.

3. The process of claim 1 wherein said weak acid is selected from the group consisting of $H_2S$, $SO_2$, $CO_2$, HCN, and phenol.

4. The process of claim 1 wherein said weak base is selected from the group consisting of ammonia and amines.

5. The process of claim 1 wherein said salt is ammonium sulfide.

6. The process of claim 5 wherein said inert gas is steam.

7. The process of claim 6 wherein said removal is carried out at a temperature of from 75° to 220° F and a pressure of from 5 to 50 psia.

8. The process of claim 7 wherein said ammonium sulfide comprises from 100 to 10,000 ppm by weight of said solution.

9. The process of claim 8 wherein said reactant comprises an acid selected from the group consisting of phosphoric acid, sulfuric acid, and hydrochloric acid.

10. The process of claim 8 wherein said reactant comprises an acid selected from the group consisting of benzene polycarboxylic acids, aliphatic polycarboxylic acids, sulfo carboxylic acids and salts thereof.

11. The process of claim 10 wherein said emulsion is separated from said solution after the acid is substantially neutralized and conveyed to a regeneration zone wherein said emulsion is contacted with steam at a temperature of from 230° to 450° F and at a pressure of from 5 to 300 psig for a period sufficiently to convert said acid substantially back to a less neutralized form.

12. A process for removing the salt of a weak acid and a volatile weak base from aqueous solution which comprises contacting said solution with an emulsion under conditions of agitation, sufficient to maintain the emulsion dispersed in said aqueous solution, said emulsion comprising an exterior phase, said exterior phase being characterized as immiscible with said solution and permeable to said weak acid, and an interior phase, said interior phase comprising a reactant which is capable of converting said weak acid to an impermeable form whereby said weak acid permeates through said exterior phase into said interior phase wherein it is converted to a nonpermeable form, and simultaneously removing said volatile weak base by passing an inert gas through said solution.

13. The process of claim 12 wherein said inert gas is steam.

14. The process of claim 12 wherein said weak acid is selected from the group consisting of $H_2S$, $SO_2$, acetic acid, $CO_2$, HCN, and phenol.

15. The process of claim 12 wherein said weak base is selected from the group consisting of ammonia and amines.

16. The process of claim 12 wherein said salt is ammonium sulfide.

17. The process of claim 16 wherein said inert gas is steam.

18. The process of claim 17 wherein said removal is carried out at a temperature of from 75° to 220° F and a pressure of from 5 to 50 psia.

19. The process of claim 18 wherein said ammonium sulfide comprises from 100 to 10,000 ppm by weight of said solution.

20. The process of claim 19 wherein said reactant comprises a base selected from the group consisting of NaOH and KOH.

21. The process of claim 19 wherein said reactant comprises a base selected from the group consisting of alkaline and alkaline earth carbonates, phosphates, and borates; and amines and hydroxyamines.

22. The process of claim 21 wherein said emulsion is separated from said solution after the base is substantially neutralized and conveyed to a regeneration zone wherein said emulsion is contacted with steam at a temperature of from 230° to 450° F and at a pressure of from 5 to 300 psig for a period sufficiently to convert said base substantially back to a less neutralized form.

* * * * *